US012684295B2

(12) United States Patent
Camberlein et al.

(10) Patent No.: US 12,684,295 B2
(45) Date of Patent: Jul. 14, 2026

(54) MAGNET ASSEMBLY FOR ELECTRODYNAMIC LOUDSPEAKER MOTOR, ELECTRODYNAMIC LOUDSPEAKER MOTOR COMPRISING SAME, AND ASSOCIATED ELECTRODYNAMIC LOUDSPEAKER

(71) Applicants: CENTRE NATIONAL DE LA RECHERCHE SCIENTIFIQUE, Paris (FR); UNIVERSITE DU MANS, Le Mans (FR)

(72) Inventors: Lionel Camberlein, Le Mans (FR); Antonin Novak, Le Mans (FR); Pierrick Lotton, Pruillé le Chétif (FR); Frédéric Polet, Le Mans (FR); Etienne Gaviot, Le Mans (FR)

(73) Assignees: CENTRE NATIONAL DE LA RECHERCHE SCIENTIFIQUE, Paris (FR); UNIVERSITE DU MANS, Le Mans (FR)

( * ) Notice: Subject to any disclaimer, the term of this patent is extended or adjusted under 35 U.S.C. 154(b) by 172 days.

(21) Appl. No.: 18/835,594

(22) PCT Filed: Jan. 10, 2023

(86) PCT No.: PCT/IB2023/050196
§ 371 (c)(1),
(2) Date: Aug. 2, 2024

(87) PCT Pub. No.: WO2023/148563
PCT Pub. Date: Aug. 10, 2023

(65) Prior Publication Data

US 2025/0133348 A1 Apr. 24, 2025

(30) Foreign Application Priority Data

Feb. 3, 2022 (FR) ...................................... 2200947

(51) Int. Cl.
*H04R 9/02* (2006.01)
*H04R 7/16* (2006.01)

(52) U.S. Cl.
CPC ............... *H04R 9/025* (2013.01); *H04R 7/16* (2013.01)

(58) Field of Classification Search
CPC .......... H04R 9/025; H04R 9/022; H04R 7/16; H04R 2400/00
See application file for complete search history.

(56) References Cited

U.S. PATENT DOCUMENTS 2,535,757 A 12/1950 Root
3,012,107 A 12/1961 Noel
(Continued)

FOREIGN PATENT DOCUMENTS

DE 19725373 A1 12/1998
EP 1434463 A2 6/2004
(Continued)

OTHER PUBLICATIONS

International Search Report w/English translation for PCT/IB2023/050196, mailed Apr. 5, 2023, 5 pages.
(Continued)

*Primary Examiner* — Sunita Joshi
(74) *Attorney, Agent, or Firm* — NIXON & VANDERHYE

(57) ABSTRACT

A magnet assembly for an electrodynamic loudspeaker driver, comprising a first outer pair of axially magnetized, permanent ring magnets, having a first thickness and a second inner pair of axially magnetized, permanent ring magnets, having a second thickness less than the first thickness, the face of the first inner magnet facing the second inner magnet being offset by a predefined offset distance (Δy) relative to the face of the first outer magnet facing the
(Continued)

second outer magnet, and the face of the second inner magnet facing the first inner magnet being offset by the predefined offset distance (Δy) relative to the face of the second outer magnet facing the first outer magnet.

12 Claims, 6 Drawing Sheets

(56) References Cited

U.S. PATENT DOCUMENTS

| | | | | |
|---|---|---|---|---|
| 2004/0136558 | A1 | 7/2004 | Usuki et al. | |
| 2007/0206830 | A1 | 9/2007 | Usuki et al. | |
| 2013/0156253 | A1 | 6/2013 | Lemarquand et al. | |
| 2017/0171660 | A1 | 6/2017 | Gaviot et al. | |
| 2017/0303038 | A1 | 10/2017 | Gaviot et al. | |
| 2018/0132041 | A1* | 5/2018 | Lim | H04R 9/047 |

FOREIGN PATENT DOCUMENTS

| | | | | |
|---|---|---|---|---|
| EP | 1472903 | A2 | 11/2004 | |
| EP | 1946607 | A2 | 7/2008 | |
| EP | 2204048 | A2 | 7/2010 | |
| EP | 3634012 | A1 * | 4/2020 | H04R 9/06 |
| EP | 3634013 | A1 | 4/2020 | |
| JP | 2003047090 | A | 2/2003 | |
| RU | 2018211 | C1 | 8/1994 | |
| RU | 2140727 | C1 | 10/1999 | |
| RU | 2150181 | C1 | 5/2000 | |
| RU | 101885 | U1 | 1/2011 | |
| RU | 129739 | U1 | 6/2013 | |
| RU | 144340 | U1 | 8/2014 | |
| RU | 148953 | U1 | 12/2014 | |
| WO | 9931931 | A1 | 6/1999 | |
| WO | 2013013502 | A1 | 1/2013 | |
| WO | 2017023485 | A1 | 2/2017 | |
| WO | 2020195837 | A1 | 10/2020 | |

OTHER PUBLICATIONS

Written Opinion of the ISA w/English translation for PCT/IB2023/050196, mailed Apr. 5, 2023, 8 pages.

French Preliminary Search Report w/English translation for FR 2200947, dated Sep. 20, 2022, 13 pages.

E. Goviet et al., “A Versatile Analytical Approach for Assessing Harmonic Distortion in Current-Driven Electrodynamic Loudspeakers”, Research Gate, Sep. 23, 2015, 25 pages.

Mehran Erza, “Contribution à l’étude des non-linéarités au sein d’une association amplificateur-transducteur: atténuation des distorsions par un mode de contrôle en courant”, HAL open science, Apr. 7, 2016, 168 pages.

* cited by examiner

[Fig. 1]
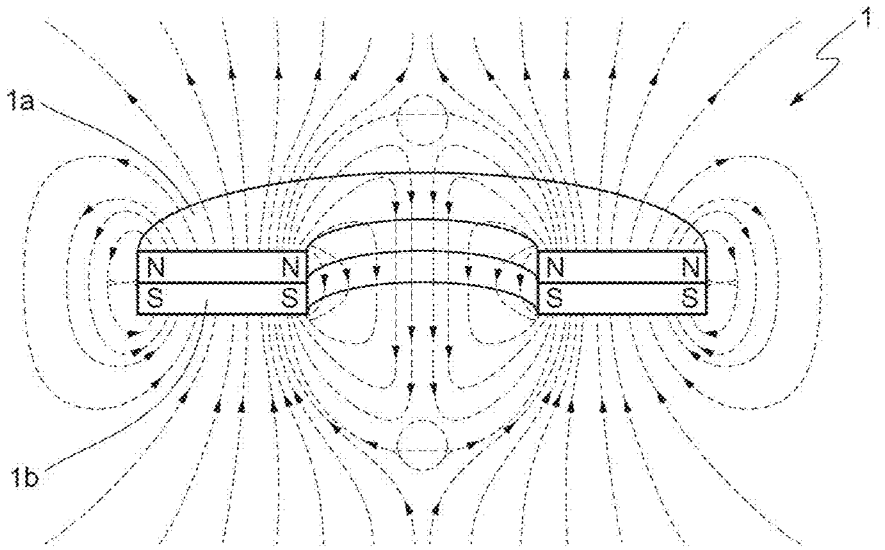
[Fig. 2]
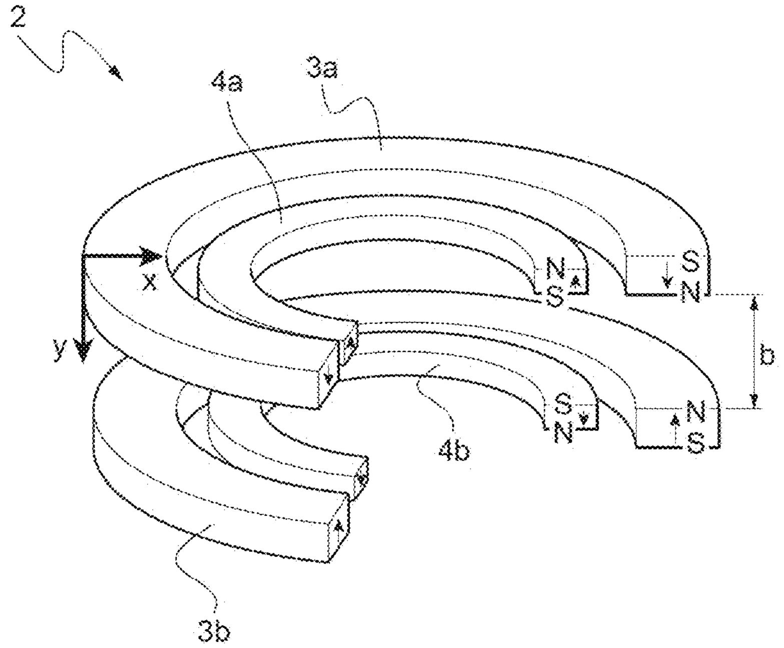

[Fig. 3]
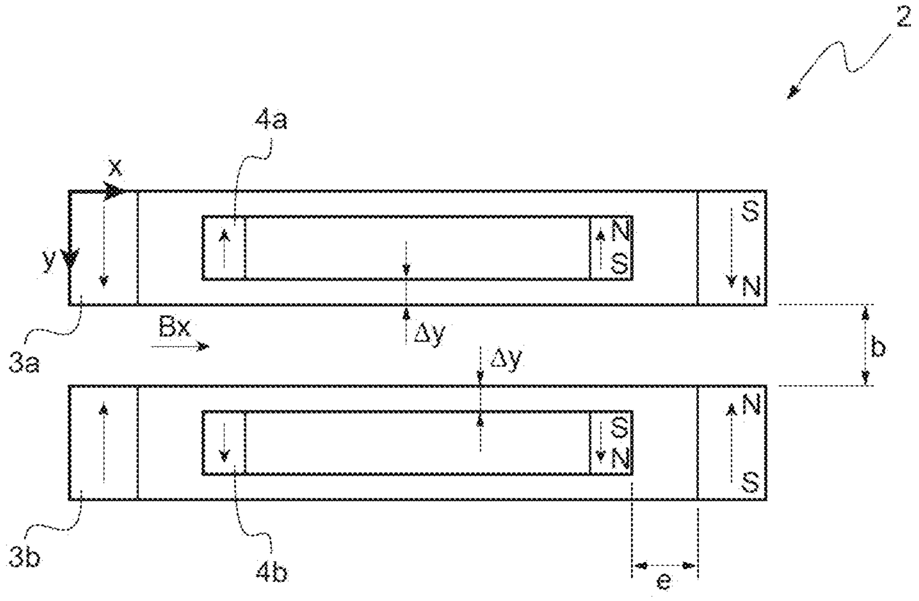

[Fig. 4]
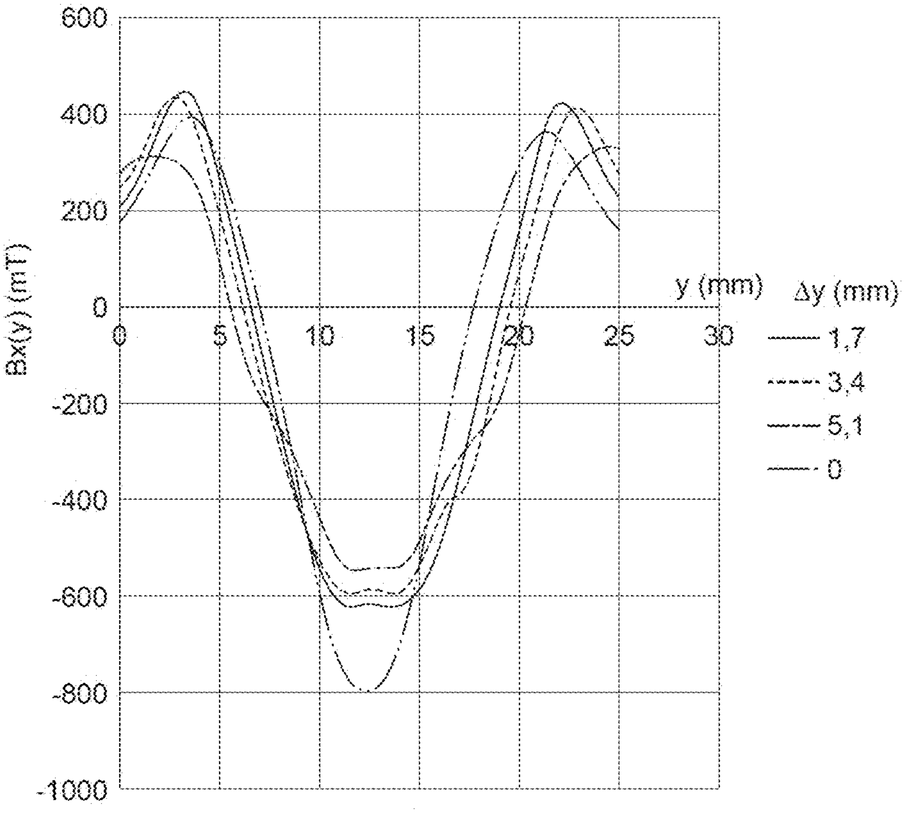
[Fig. 5]
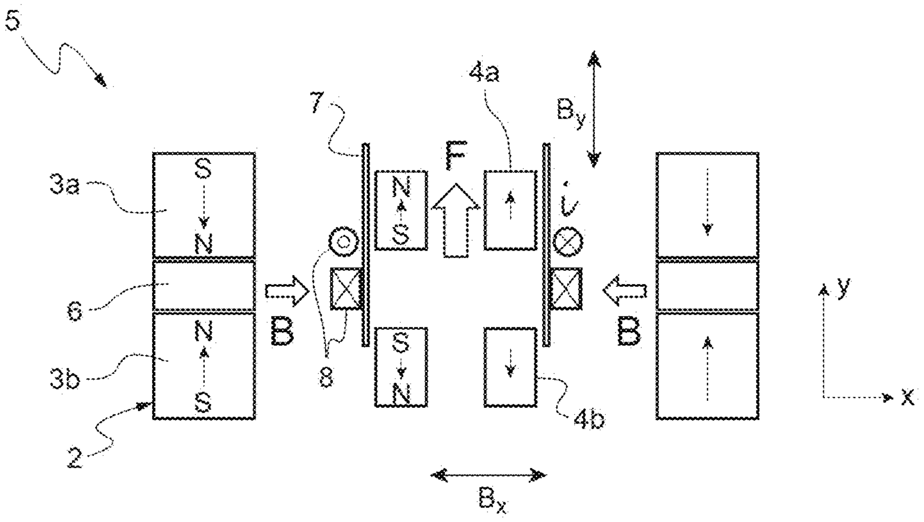

[Fig. 6]
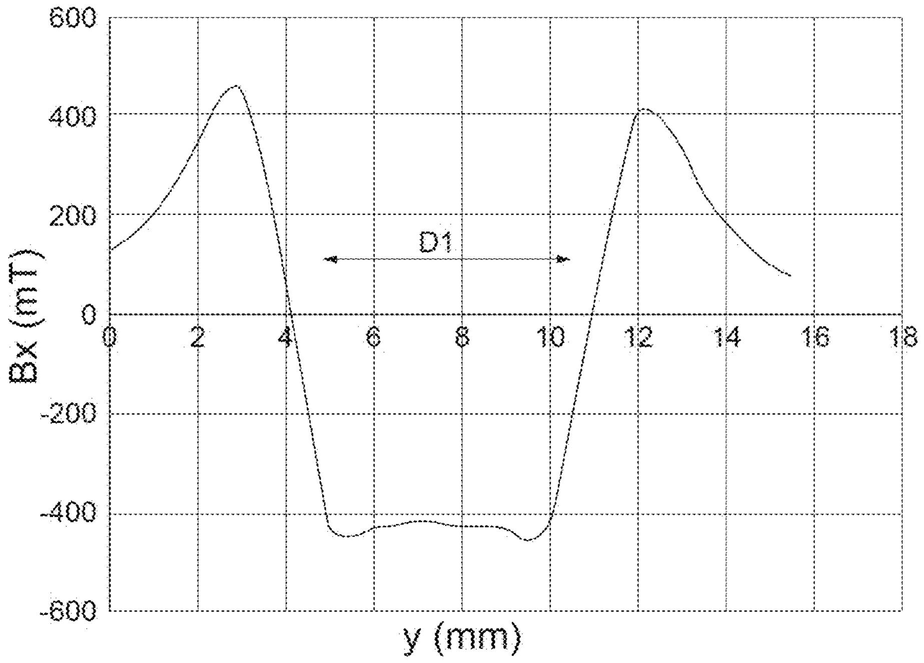
[Fig. 7]
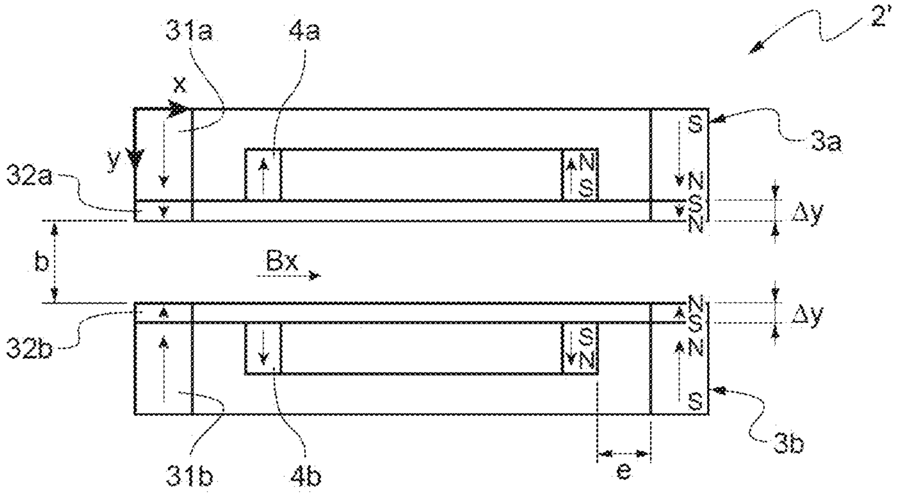

[Fig. 8]
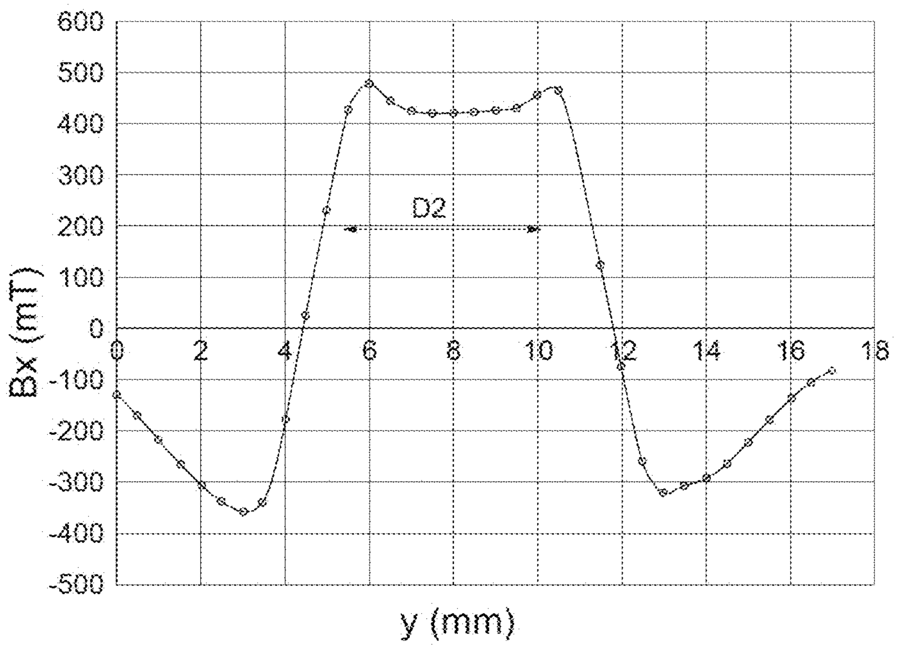
[Fig. 9]
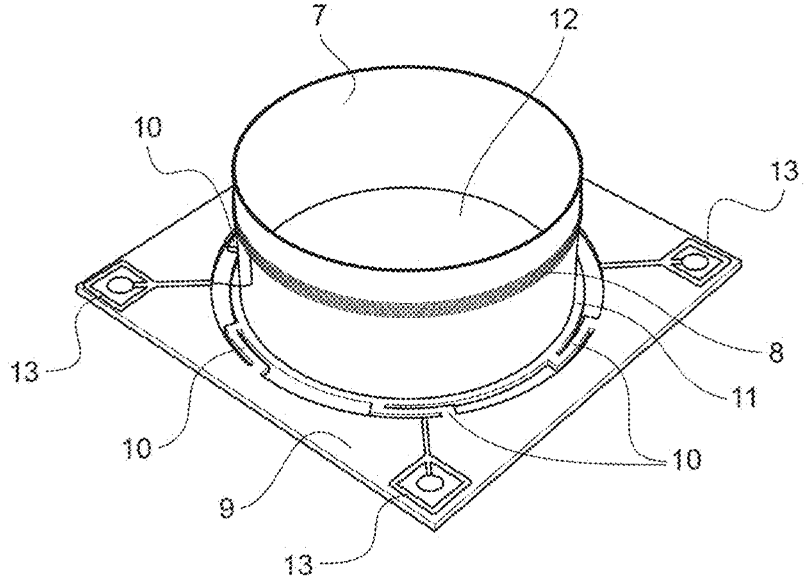

[Fig. 10]
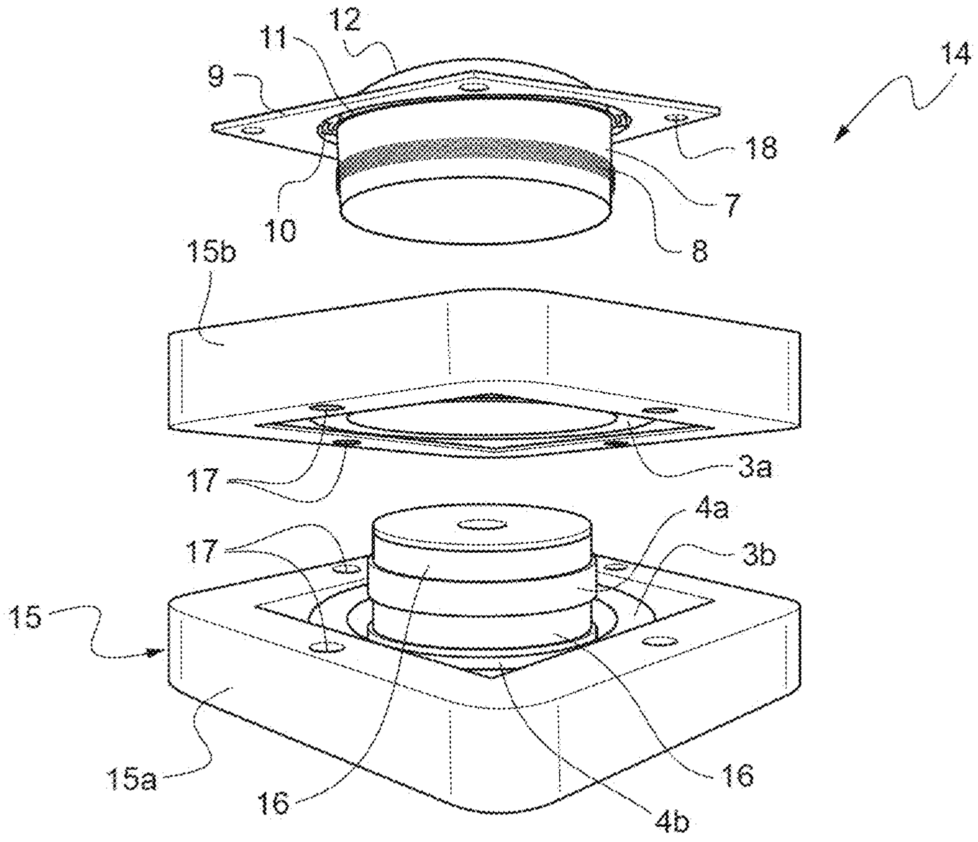

MAGNET ASSEMBLY FOR ELECTRODYNAMIC LOUDSPEAKER MOTOR, ELECTRODYNAMIC LOUDSPEAKER MOTOR COMPRISING SAME, AND ASSOCIATED ELECTRODYNAMIC LOUDSPEAKER

This application is the U.S. national phase of International Application No. PCT/IB2023/050196 filed Jan. 10, 2023 which designated the U.S. and claims priority to FR 2200947 filed Feb. 3, 2022, the entire contents of each of which are hereby incorporated by reference.

The present invention relates to the field of electrodynamic loudspeakers, and in particular, to a magnet assembly for an electrodynamic loudspeaker driver, to an electrodynamic loudspeaker driver comprising said magnet assembly, and to an electrodynamic loudspeaker comprising said driver. A conventional electrodynamic loudspeaker driver comprises an electromagnetic actuator, most often consisting of a winding arranged on a moving element, within a magnetic field generated by a permanent magnet assembly, the configuration of the permanent magnetic field presenting a so-called radial symmetry between the north and south poles of the permanent magnet assembly. When an amplitude and frequency modulated current flows through the winding, the mechanical displacement induced at audible frequency is transformed into a sound field by means of a diaphragm acting as an emissive surface, also known as an acoustic radiator. The sound quality of the electrodynamic loudspeaker depends on the frequency response curve, which must be as invariant as possible over the entire bandwidth (for example, from 16 Hz to 20,000 Hz), and on the linearity of the system, marked by the presence of minimal harmonic distortion and intermodulation.

If the electrodynamic loudspeaker favors all frequencies equally, the reproduction of the timbre of a musical instrument, which constitutes the useful sound harmonics, seems, a priori, able to be assured. The reality, however, is more complex, given the need to adequately reproduce sound attack transients, representative of the acoustic signature of quality instruments. The response of the loudspeaker to transients is an essential condition of "fidelity", which can be tested by detecting the "dragging" of the diaphragm when the loudspeaker is subjected to a train of pulses. The inertia of the moving element and the forces due to self-induction contribute to this defect. Acoustic, optical and electrical measurements show that there is no such thing as an ideal electrodynamic loudspeaker, and that each design presents shortcomings in terms of bandwidth limitation, various resonance peaks and inertia. In principle, the coupling of several loudspeakers allows many of these shortcomings to be overcome, but on the other hand, the cumulative effect of these shortcomings can sometimes be unacceptable to quality musical reproduction.

In addition, existing electrodynamic loudspeakers have generally mediocre electroacoustic efficiencies, with values ranging from 0.5% to 5%. By way of example, a room needs to be sounded with around 100 $W_{RMS}$ to ensure reproduction of the fortissimo of a piano delivering around 150 mW.

The useful driving force behind the displacement of the moving element results from the interaction of the magnetic induction field, denoted B, with each length element of the winding through which a current, denoted i(t), flows. Locally, the elementary force F (in Newtons) applied to a charge carrier in displacement within an induction field is referred to as a Lorentz force and is exerted in a direction perpendicular to the plane defined by the field and the carrier velocity. An assessment within an elementary charge-carrying volume subject to the phenomenon leads to the expression:

$$F = i \cdot \int_0^l \vec{B} \cdot d\vec{l} = B \cdot l \cdot i \quad [1]$$

Everything is as if the unwound length of the winding, noted l, were exposed to a homogeneous magnetic induction field, which allows to define the quantity $B_l$=B.l called the force factor (in N/A or T.m) of the driving part (also called the "driver") of the electrodynamic loudspeaker.

This intensity-modulated force acts on the moving element, the mechanical behavior of which is dictated by three components: a force of inertia, the product of the mass of the moving parts ($M_m$) multiplied by the imposed acceleration, a damping force, generally considered proportional to displacement speed via a constant noted $f_m$ (in N/(m/s) or kg/s) ($f_m$ is most often noted $R_m$ in terms of mechanical resistance), and a restoring force linked to suspension mechanics assigned a stiffness noted $k_m$ (in N/m). For translation guided on an axis x, the behavioral equation of such an idealized electrodynamic loudspeaker is written:

$$F = B_l \cdot i = M_m \cdot \frac{d^2x}{dt^2} + f_m \cdot \frac{dx}{dt} + k_m \cdot x \quad [2]$$

This general description of any damped oscillator can be found in many physical systems.

The equation [2] in all its generality presents in its left-hand member the oscillation control solicitation of the system described by the right-hand member. In this sense, the application of the Lorentz force historically underlines the originality of the invention of the loudspeaker, motivated by the intensive development of the telephone (tube amplifiers (thermionic vacuum tubes, known as radio tubes) had not yet been developed, and the notion of electrical impedance was still unclear to the skilled person).

Ideally, whatever the current, the force factor $B_l$=B.l should remain invariant, whatever the position of the moving element during operation.

It is thus useful to plot Bi as a function of x, the latter parameter denoting the displacement of the diaphragm according to the longitudinal direction of the loudspeaker, to get an idea of the quality of the loudspeaker. Ideally, it would be important to have a flat plot over the entire operating range for optimum reproduction of solicitation signals. For an electrodynamic loudspeaker according to the state-of-the-art, representation of this plot takes the form of an approximate Gaussian, and numerous developments have sought (with very relative success) to improve this behavior. The generic layout of the moving element in a conventional loudspeaker shows the proximity of the coil to the fixed parts of the permanent magnet assembly. Such a configuration is conducive to the generation of eddy currents within the fixed electrically conductive parts when the moving element is activated, particularly at high frequencies.

In addition, the generic configuration of a conventional electrodynamic loudspeaker involves, for the driving part, the implementation of a magnetic assembly generally including ferrous materials at its center in order to achieve a radial configuration of the magnetic field. These materials are relatively inexpensive; however, they lead to degradation of the high-frequency signals in view of the eddy currents resulting from the displacement of the current-carrying winding of the moving element. In order to compensate for this, various inventors have sought to implement different materials, while scrupulously respecting a "monolithic" configuration suitable for establishing radial field lines. Although relatively efficient, radially shaped field assemblies are technically difficult to manufacture and are therefore generally very expensive.

The European patent application EP3634013A1 describes a magnet system for an electromechanical transducer, in which the magnet system comprises a first outer pair of axially magnetized permanent ring magnets and a second inner pair of axially magnetized permanent ring magnets in opposite polarity relative to the first pair of permanent magnets, a voice coil being arranged in the air gap formed between the first pair of permanent magnets and the second pair of permanent magnets. However, the thicknesses of the permanent magnets of the first and second pairs being identical, this existing magnet system does not allow a constant magnetic field to be obtained, which can be observed over the entire stroke of the moving element of the electrodynamic loudspeaker driver, and therefore does not allow the force factor of the driving part to be linearized over the entire useful stroke of the voice coil. Indeed, with this existing magnet system, the evolution of the magnetic field in the space associated with the stroke of the moving element is highly distorted. Furthermore, in EP3634013A1, two solid elements are present between the upper and lower magnets, these solid elements being metals or alloys with very high electrical conductivity values. However, the presence of these metallic elements generates eddy currents (generated within any conductive mass arranged in the vicinity of the coil (through which current flows) during movement of the moving element), leading to a degrading effect on high-frequency signals.

The magnet system described in US patent application US2018/132041A1 presents the same drawbacks.

The present invention aims to resolve the drawbacks of the prior art, by providing a magnet assembly for an electrodynamic loudspeaker driver, comprising a first outer pair of axially magnetized permanent ring magnets and a second inner pair of axially magnetized, permanent ring magnets, the thickness of the permanent magnets of the second inner pair being less than that of the permanent magnets of the first outer pair, and each permanent magnet of the second inner pair being offset by a predefined non-zero offset distance within the associated permanent magnet of the first outer pair, which allows a magnetic field-compensated electrodynamic ring loudspeaker with low electrical and mechanical losses, thus allowing quality sound reproduction including far fewer losses and non-linearity distortions than conventional loudspeakers to be obtained.

The present invention, therefore, has as its object a magnet assembly for an electrodynamic loudspeaker driver, said magnet assembly comprising a first outer pair of magnets and a second inner pair of magnets; the first outer pair of magnets comprising a first outer, axially magnetized permanent ring magnet and a second outer, axially magnetized, permanent ring magnet, said first and second outer permanent ring magnets being arranged axially facing each other, being spaced from each other and having the same first thickness; the second inner pair of magnets comprising a first inner, axially magnetized, permanent ring magnet and a second inner, axially magnetized, permanent ring magnet, said first and second inner permanent ring magnets being arranged axially facing one another, being spaced apart from one another and having the same second thickness, the first and second inner permanent ring magnets and the first and second outer permanent ring magnets being coaxial, in other words having the same central axis of symmetry, the first inner permanent magnet being arranged inside the first outer permanent magnet and the second inner permanent magnet being arranged inside the second outer permanent magnet so that an air gap is formed between the first outer pair of magnets and the second inner pair of magnets; the direction of the north-south magnetic field of the first inner permanent magnet being opposite to that of the first outer permanent magnet, the direction of the north-south magnetic field of the first inner permanent magnet being opposite to that of the second inner permanent magnet, and the direction of the north-south magnetic field of the first outer permanent magnet being opposite to that of the second outer permanent magnet; characterized in that the second thickness is less than the first thickness; and the face of the first inner permanent magnet that is facing the second inner permanent magnet is offset by a predefined non-zero offset distance relative to the face of the first outer permanent magnet that is facing the second outer permanent magnet, and the face of the second inner permanent magnet that is facing the first inner permanent magnet is offset by the predefined offset distance relative to the face of the second outer permanent magnet that is facing the first outer permanent magnet. Each of the four permanent magnets forming the magnet assembly is in the form of a ring, in such a way that each permanent magnet in the form of a ring has a central axis of symmetry. Thus, given that the permanent ring magnets are coaxial, they have the same central axis of symmetry.

By axially magnetized permanent ring magnet is understood to mean a permanent magnet in the form of a ring presenting an axial flux magnetic field relative to the central axis of symmetry of the ring. The permanent ring magnet is thus magnetized relative to its thickness (in other words, height), the north pole of the permanent ring magnet is found on one of the two circular faces located at the ends of the ring, and the south pole of the permanent ring magnet is found on the other of the two circular faces located at the ends of the ring.

Each ring (in other words, permanent ring magnet) is defined by the following dimensions: its outer diameter, its inner diameter and its thickness. The cross-section of the ring is thus defined by its thickness multiplied by the difference between its outer diameter and its inner diameter. By thickness of the permanent ring magnet is understood to mean the distance between its lower circular face and its upper circular face, in other words, the height of the ring according to its central axis of symmetry.

Thus, the magnet assembly according to the present invention has a specific arrangement of permanent ring magnets presenting an axial flux magnetic field, the second pair of axially magnetized permanent magnets being inserted within the first pair of axially magnetized permanent magnets keeping the same central axis of symmetry and in opposition of polarity relative to the first pair of magnets in order to ensure a magnetic field compensation function.

Indeed, the predefined offset distance (noted $\Delta y \neq 0$) between the planes of the permanent magnets of the second inner pair and the planes of the respective permanent magnets of the first outer pair makes it possible to obtain a substantially constant value of the radial component of the magnetic field in the air gap of the magnet assembly. The magnet assembly of the present invention thus allows a substantially constant value of the physical quantity force factor (B.l) at any point along the useful stroke of the loudspeaker coil within the air gap of the magnet assembly to be obtained. The offset of the permanent magnets of the second inner pair relative to those of the first outer pair thus allows a so-called compensation (rectification) function of the magnetic field strength pattern non-linearities in the magnet assembly to be introduced.

In the present invention, the coupling by pairs of different axially magnetized ring magnets thus allows to obtain spatially an exploitable zone with as constant a magnetic field as possible, within which the coil of the electrodynamic loudspeaker can move (in a direction noted y, perpendicular to the planes of the ring magnets). As the coil windings have a fixed developed length, this results in the desired invariance of the force factor $B_l$.

The magnet assembly of the present invention can thus be used in an electrodynamic loudspeaker driver without any iron, involving optimal compensated magnetic field configurations, obtained by the judicious arrangement of axially magnetized permanent ring magnets.

According to a particular feature of the invention, the first and second outer permanent magnets are separated by at least one from among air and a non-metallic material such as a polymer.

Thus, the absence of metallic material or alloys (and therefore conductive materials) between the outer permanent magnets allows the generation of eddy currents to be minimized, in such a way as to guarantee minimum energy losses.

According to a particular feature of the invention, the first and second inner permanent magnets are separated by at least one from among air and a non-metallic material such as a polymer.

Thus, the absence of metallic material or alloys between the inner permanent magnets allows the generation of eddy currents to be minimized, in such a way as to guarantee minimum energy losses.

In practice, any type of polymer suitable for mechanically mounting magnets in a loudspeaker cabinet, for example, machined polyvinyl chloride (PVC), can be used to separate magnets of the same pair. It should be noted that the separation pieces could also be made by three-dimensional (3D) printing, without departing from the scope of the present invention.

According to a particular feature of the invention, each of the first and second outer permanent magnets is constituted of two axially magnetized permanent ring sub-magnets which are superimposed and have the same inner diameter, the same outer diameter, the same north-south magnetic direction and are of different thicknesses. Thus, this specific configuration of the first outer pair of permanent magnets allows to obtain a substantially constant value of the radial component of the magnetic field in the air gap of the magnet assembly over a greater extent in the direction y, in other words, over a greater stroke of the coil in the air gap.

According to one particular feature of the invention, for each of the first and second outer permanent magnets, the permanent sub-magnet facing the other of the first and second outer permanent magnets has a thickness equal to the predefined offset distance.

According to one particular feature of the invention, the ratio of the first thickness to the second thickness is between 1 and 5.

According to one particular feature of the invention, the predefined offset distance is between 2% and 50% of the first thickness.

Note that, in all cases, the second thickness must be less than or equal to the first thickness minus the predefined offset distance.

According to a particular feature of the invention, the air gap between the first outer pair of magnets and the second inner pair of magnets has a spacing of between 0.5 mm and 6 mm.

The aim of the present invention is thus to proceed with the displacement of the coil within a magnetic field that is as homogeneous as possible, but at a significant distance from each of the elements of the pairs of ring magnets generating this field. This distance and the absence of ferrous material ensure that energy losses associated with eddy currents are kept to a minimum.

In the present invention, the air-gap spacing is thus increased relative to the standard state of the art, thus allowing for a possible lateral displacement of the coil of the moving element, (default, for example, due to residual non-linearities), thus avoiding any risk of snagging between the moving element and the permanent magnets during temporary faulty operation of the electrodynamic loudspeaker.

According to a particular feature of the invention, the permanent magnets of the first and second pairs of magnets are made of at least one material from among neodymium, iron, boron, cobalt, nickel, a ferromagnetic ceramic comprising at least one from among iron oxide, samarium, zinc and aluminum.

The present invention also has as its object an electrodynamic loudspeaker driver comprising a magnet assembly such as described above and a moving element comprising a cylindrical coil support which is partly inserted into the air gap of the magnet assembly, and on which is wound a coil arranged in the air gap of the magnet assembly.

Thus, the injection of an amplitude and frequency modulated current into the coil carried by the moving element causes the displacement of the moving element, and therefore the coil, into the air gap of the magnet assembly, in which the radial component of the magnetic field generated is substantially constant (in other words, a force factor B.l is substantially invariant over the entire useful stroke of the coil), which allows high-quality sound reproduction including far fewer losses and non-linearity distortions than conventional loudspeakers.

The driver according to the present invention can be voltage driven (in the traditional way) but is also particularly suitable for being subject to a current control mode (for a drive regime imposed by an electronic conditioner of the voltage/current converter type).

According to one particular feature of the invention, the moving element is made of polyimide film (such as Kapton®).

The present invention has, in addition, as its object an electrodynamic loudspeaker comprising a chassis in which are arranged an electrodynamic loudspeaker driver such as described above, and a diaphragm connected to the moving element of the driver.

Thus, the mechanical displacement of the moving element induced at audible frequency is transformed into a sound field by means of the diaphragm acting as an emissive surface (also known as an acoustic radiator).

To better illustrate the object of the present invention, preferred embodiments will be described below, by way of illustration and not limitation, with reference to the appended drawings.

In these drawings:

FIG. 1 is a cross-sectional view of an axially magnetized permanent ring magnet;

FIG. 2 is a perspective view of a partially truncated magnet assembly according to a first embodiment of the present invention;

FIG. 3 is a cross-sectional view of the magnet assembly according to the first embodiment of the present invention;

FIG. 4 represents different curves of the radial component of the magnetic field of the magnet assembly of the first embodiment along the axis y for different values of offset distance;

FIG. 5 is a cross-sectional view of an electrodynamic loudspeaker driver according to the first embodiment of the present invention;

FIG. 6 is an example curve representing the radial component of the magnetic field of the driver of the first embodiment along the axis y for an optimum offset distance value of 1.7 mm;

FIG. 7 is a cross-sectional view of a magnet assembly according to a second embodiment of the present invention;

FIG. 8 is an example curve representing the radial component of the magnetic field of the driver of the second embodiment along the axis y for an optimum offset distance value of 1.5 mm;

FIG. 9 is a perspective view of a moving element of the driver according to the present invention; and FIG. 10 is an exploded view of an electrodynamic loudspeaker according to the present invention.

Referring to FIG. 1, it can be seen that an axially magnetized permanent ring magnet 1 is represented.

The axially magnetized permanent ring magnet 1 comprises a north magnetic pole (N) 1*a* and a south magnetic pole(S) 1*b* arranged one above the other so as to generate an axial flux magnetic field, the dotted lines in FIG. 1 representing the field strength pattern associated with this axially magnetized permanent magnet 1. The permanent ring magnet 1 is thus in the form of a ring and presents an axial flux magnetic field relative to its central axis of symmetry. The permanent ring magnet 1 is thus magnetized relative to its thickness (in other words, its height along its central axis of symmetry), its north magnetic pole (N) is found on one of its two end faces, and its south magnetic pole(S) is found on the other of its two end faces. Referring to FIGS. 2 and 3, it can be seen that a magnet assembly 2 is represented according to a first embodiment of the present invention.

The magnet assembly 2 comprises a first outer pair of magnets comprising a first outer, axially magnetized, permanent ring magnet 3*a* and a second outer, axially magnetized, permanent ring magnet 3*b*, the first and second outer permanent magnets 3*a* and 3*b* being identical and arranged axially facing one another and spaced apart from each other by a distance b, the first and second outer permanent magnets 3*a* and 3*b* having the same first thickness.

The magnet assembly 2 further comprises a second inner pair of magnets comprising a first inner, axially magnetized, permanent ring magnet 4*a* and a second inner, axially magnetized, permanent ring magnet 4*b*, the first and second inner permanent magnets 4*a* and 4*b* being identical and arranged axially facing one another and spaced apart from each other by a distance b+2Δy, the first and second inner permanent magnets 4*a* and 4*b* having the same second thickness, which is less than the first thickness of the first and second outer permanent magnets 3*a* and 3*b*.

The first and second inner permanent magnets 4*a* and 4*b* and the first and second outer permanent magnets 3*a* and 3*b* are coaxial.

The first inner permanent magnet 4*a* is arranged inside the first outer permanent magnet 3*a*, and the second inner permanent magnet 4*b* is arranged inside the second outer permanent magnet 3*b*, so that an air gap e is formed between the first outer pair of magnets and the second inner pair of magnets.

The magnetic polarity (in other words, the north-south magnetic field direction) of the first inner permanent magnet 4*a* is opposite to that of the first outer permanent magnet 3*a*, the magnetic polarity of the first inner permanent magnet 4*a* is opposite to that of the second inner permanent magnet 4*b*, and the magnetic polarity of the first outer permanent magnet 3*a* is opposite to that of the second outer permanent magnet 3*b*.

In FIGS. 2 and 3, the north magnetic poles of the first and second outer permanent magnets 3*a* and 3*b* are facing each other, and the south magnetic poles of the first and second inner permanent magnets 4*a* and 4*b* are facing each other. However, a reverse arrangement could also be envisaged, with the south magnetic poles of the first and second outer permanent magnets 3*a* and 3*b* facing each other, and the north magnetic poles of the first and second inner permanent magnets 4*a* and 4*b* facing each other, without departing from the scope of the present invention.

The face of the first inner permanent magnet 4*a* that is facing the second inner permanent magnet 4*b* is offset by a predefined non-zero offset distance Δy relative to the face of the first outer permanent magnet 3*a* that is facing the second outer permanent magnet 3*b*.

Similarly, the face of the second inner permanent magnet 4*b* that is facing the first inner permanent magnet 4*a* is offset by the predefined offset distance Δy relative to the face of the second outer permanent magnet 3*b* that is facing the first outer permanent magnet 3*a*.

The magnet assembly 2 thus has a specific arrangement of permanent ring magnets 3*a*, 3*b*, 4*a* and 4*b* presenting an axial flux magnetic field, the second pair of axially magnetized permanent magnets 4*a*, 4*b* being inserted within the first pair of axially magnetized permanent magnets 3*a*, 3*b* keeping the same central axis of symmetry and in opposite polarity relative to the first pair of magnets 3*a*, 3*b*.

The predefined offset distance Δy between the planes of the permanent magnets 4*a*, 4*b* of the second inner pair and the planes of the respective permanent magnets 3*a*, 3*b* of the first outer pair allow a substantially constant value of the radial component Bx of the magnetic field in the air gap e of the magnet assembly 2 to be obtained. The offset of the permanent magnets 4*a*, 4*b* of the second inner pair relative to those of the first outer pair thus allow a so-called compensation (rectification) function for non-linearities in the magnetic field strength pattern in the magnet assembly 2 to be introduced.

According to the specific embodiment represented in FIGS. 2 and 3, the ring magnets 3*a* and 3*b* of the first outer pair of magnets have, by way of example, a rectangular cross-section, an outer diameter of 30 mm, an inner diameter of 25 mm, a thickness of 4 mm, a distance b between the inner faces of 6 mm, and a material of the Nd—Fe—B (neodymium-iron-boron) type.

Furthermore, according to the specific embodiment represented in FIGS. 2 and 3, the ring magnets 4*a* and 4*b* of the second inner pair of magnets have, by way of example, a rectangular cross-section, an outer diameter of 17 mm, an inner diameter of 10.25 mm, a thickness of 2.45 mm, a distance b+2Δy between the inner faces of 6 mm+2 Δy, and a material of the Nd—Fe—B type.

It should be noted that the ratio of the first thickness of the outer magnets 3*a* and 3*b* to the second thickness of the inner magnets 4*a* and 4*b* could also be between 1 and 5, without departing from the present invention.

The predefined offset distance Δy could be between 2% and 50% of the first thickness of the outer magnets 3*a* and 3*b*, although the second thickness of the inner magnets 4*a* and 4*b* must be less than or equal to the first thickness minus the predefined offset distance Δy.

In the specific embodiment represented in FIGS. 2 and 3, the air gap e thus has a spacing of 4 mm. However, the air gap e could also have a spacing of between 0.5 mm and 6 mm, without departing from the scope of the present invention. In addition, the permanent magnets 3*a*, 3*b*, 4*a* and 4*b* could also be made of at least one from among neodymium, iron, boron, cobalt, nickel, a ferromagnetic ceramic comprising at least one from among iron oxide, samarium, zinc and aluminum, without departing from the scope of the present invention.

Referring to FIG. 4, it can be seen that different curves of the measured radial component Bx of the magnetic field generated by the magnet assembly 2 along the axis y (represented in FIGS. 2 and 3) are depicted, for different values of the offset distance Δy, positioned at x=4 mm on the axis x (represented in FIGS. 2 and 3). As represented in FIGS. 2 and 3, the zero point of the axis y is defined on the upper face of the first outer magnet 3*a* of the magnet assembly 2. A probe is then displaced from the top to the bottom (with x=4 mm, where x=0 mm corresponds to the left outer lateral face of the first pair of magnets 3*a*, 3*b*), to $y_{max}$ defined by the lower face of the second outer magnet 3*b* of the magnet assembly 2. FIG. 4 then presents the values of the radial component Bx of the magnetic field collected during the trajectory of the probe, which is translated by a reading from left to right on the axis y arranged on the abscissa.

An offset distance of Δy taken in successive steps leads to a set of measurements the different values of which are represented in FIG. 4.

It can be seen that, without an offset (Δy=0), a constant force factor cannot be obtained.

In addition to Δy=0, three values of Δy are represented in FIG. 4 (Δy=1.7 mm, 3.4 mm and 5.1 mm). The best conformation of the magnetic field is observed for Δy=1.7 mm with a usable stroke of around 5 mm (when y is between around 10 mm and around 15 mm), thus guaranteeing a constant force factor over this stroke. The magnet assembly 2 according to the present invention thus allows a magnetic field strength pattern to be obtained, the lines of which are idealized with respect to a relative invariance of the product B×l when the latter is observed as a function of the quasi-static position of the moving element of the electrodynamic loudspeaker. Referring to FIG. 5, it can be seen that it represents an electrodynamic loudspeaker driver 5 comprising the magnet assembly 2 according to the first embodiment of the present invention.

The first and second outer permanent magnets 3*a* and 3*b* are separated by a ring of non-metallic material 6 such as a polymer.

It should be noted that the ring 6 could also be replaced by air, without departing from the scope of the present invention.

Although not represented in FIG. 5, the first and second inner permanent magnets 4*a* and 4*b* are also separated by a ring of non-metallic material or by air.

The absence of metallic material or alloys between the outer permanent magnets 3*a* and 3*b* and between the inner permanent magnets 4*a* and 4*b* minimizes the generation of eddy currents, so as to guarantee minimum energy losses.

In practice, any type of polymer suitable for mechanically mounting magnets in a loudspeaker enclosure, for example machined polyvinyl chloride (PVC), can be used to separate magnets of the same pair.

The magnet assembly 2 of the present invention thus allows an electrodynamic loudspeaker driver 5 without iron, to be used involving compensated optimal magnetic field configurations.

The electrodynamic loudspeaker driver 5 comprises the magnet assembly 2 and a cylindrical support-type moving element 7 which is inserted into the air gap of the magnet assembly 2 and on which is wound a coil 8 arranged in the air gap of the magnet assembly 2.

The magnetic field B generated by the magnet assembly 2 has a radial component Bx according to the axis x and an axial component By according to the y axis.

This generic representation of the electrodynamic loudspeaker driver 5 shows the coil 8 moving according to the axis y and subjected to the radial component Bx of the magnetic field B generated by the magnet assembly 2, the magnetic field B being oriented toward the center of the magnet assembly 2, in other words, toward the coil 8.

An amplitude and frequency modulated current i is injected into the coil 8 carried by the moving element 7.

Applying Maxwell's rule, allows the direction of the Lorentz force F driving the displacement of the moving element 7 to be determined.

The injection of the current i into the coil 8 thus causes the displacement of the moving element 7 according to the axis y, and thus the coil 8, in the air gap of the magnet assembly 2, in which the generated radial component Bx of the magnetic field B is substantially constant (in other words, a force factor B.l substantially constant at any point of the useful stroke of the coil 8 within the air gap of the magnet assembly 2), which allows a quality sound reproduction including far fewer losses and non-linearity distortions than conventional loudspeakers.

The driver 5 according to the present invention can be voltage driven (in the traditional way), but is also particularly suitable to be the subject of a current control mode (for a drive regime imposed by an electronic conditioner of the voltage/current converter type).

The air-gap spacing e of the magnet assembly 2 being increased relative to the state of the art, a possible lateral displacement of the coil 8 of the moving element 7 (for example, due to residual non-linearities) is possible, thus avoiding any risk of snagging between the moving element 7 and the permanent magnets 3*a*, 3*b*, 4*a*, 4*b* during temporary faulty operation of the driver 5.

The driver 5 according to the present invention thus allows the displacement of the coil 8 according to the axis y within a magnetic field B that is as homogeneous as possible, but at a significant distance from each of the permanent magnets 3*a*, 3*b*, 4*a*, 4*b* generating this magnetic field B. The large air-gap spacing e and the absence of ferrous material ensure minimum energy losses associated with eddy currents, these latter being kept to a minimum.

Referring to FIG. 6, it can be seen that the radial component Bx of the magnetic field B of the driver 5 of the first embodiment measured along the axis y for an optimum offset distance value Δy=1.7 mm is represented.

An optimum offset distance value Δy is first sought experimentally for the magnet assembly 2 according to the first embodiment. It should be noted that this optimum value could also be sought automatically, without departing from the scope of the present invention. As illustrated in FIG. 4, an optimum value Δy=1.7 mm is found. FIG. 6 represents the measurement of the radial component Bx of the magnetic field B generated by the magnet assembly 2 along the axis y (located at x=4 mm) when Δy=1.7 mm.

It is clear that the operational travel D1 of the coil 8 carried by the moving element 7 over which the radial component Bx is substantially constant (and therefore the force factor B.l is substantially constant) is approximately 5 mm, in such a way that the useful travel at constant force factor of the coil 8 in the air gap is approximately 5 mm.

Referring to FIG. 7 it can be seen that a magnet assembly 2' according to a second embodiment of the present invention is represented.

The magnet assembly 2' according to the second embodiment in FIG. 7 is identical to the magnet assembly 2 according to the first embodiment in FIG. 3, with the exception that the first outer permanent magnet 3*a* is constituted of two axially magnetized permanent ring sub-magnets 31*a* and 32*a* which are superimposed and have the same inner diameter, the same outer diameter, the same magnetic polarity and different thicknesses, and that the second outer permanent magnet 3*b* is constituted of two axially magnetized permanent ring sub-magnets 31*b* and 32*b* which are superimposed and have the same inner diameter, the same outer diameter, the same magnetic polarity and different thicknesses.

The permanent sub-magnet 32*a* of the first outer permanent magnet 3*a* is arranged facing the second outer permanent magnet 3*b*, and the permanent sub-magnet 32*b* of the second outer permanent magnet 3*b* is arranged facing the first outer permanent magnet 3*a*.

The permanent sub-magnets 31*a* and 31*b* have the same thickness, and the permanent sub-magnets 32*a* and 32*b* also have the same thickness.

In FIG. 7, the thickness of the permanent sub-magnets 32*a* and 32*b* is equal to the predefined offset distance Δy.

However, the permanent sub-magnets 32*a* and 32*b* could also be of a different thicknesses, without departing from the scope of the present invention.

Referring to FIG. 8, it can be seen that it represents the radial component Bx of the magnetic field B generated by the magnet assembly 2' according to the second embodiment measured along the axis y (located at x=4 mm) when Δy=1.5 mm. Being given that the offset distance value chosen during measurement is Δy=1.5 mm, it follows that the thickness of sub-magnets 32*a* and 32*b* is 1.5 mm, and that the thickness of sub-magnets 31*a* and 31*b* is 2.5 mm.

It is clear that with the magnet assembly 2' according to the second embodiment, the operational travel D2 of the coil 8 over which the radial component Bx is substantially constant (and therefore the force factor B.l is substantially constant) is approximately 6 mm, in such a way that the useful travel at constant force factor of the coil 8 in the air gap is approximately 6 mm, which is significant in terms of the state of the art, considering the overall dimensions of the device.

Referring to FIG. 9, it can be seen that it represents the moving element 7 of the driver 5.

The moving element 7 of the cylindrical support type carries the coil 8 wound around it.

One end of the moving element 7 is connected to a diaphragm 11, which in turn is connected to a square frame 9 by means of a number of flexible arms 10 cut from the diaphragm material.

The moving element 7 is thus commonly referred to as a "piston".

The moving element 7 and the diaphragm 11 can, for example, be made of polyimide film such as Kapton®.

The frame 9 can, for example, be made of epoxy glass.

A dome 12 closes the opening of the moving element 7 at the end connected to the diaphragm 11.

The frame 9 also includes electrical tracks 13 allowing to supply power to the coil 8. The structure of the moving element 7 is optimized to cause minimum energy losses in terms of the electrical source responsible for driving the device.

Referring to FIG. 10 it can be seen that an electrodynamic loudspeaker 14 according to the present invention is represented.

The electrodynamic loudspeaker 14 comprises a chassis 15, constituted of a first housing part 15*a* and a second housing part 15*b*, in which are mounted the driver 5 (in other words, the magnet assembly 2 or 2' and the moving element 7 carrying the coil 8), the diaphragm 11 and the frame 9.

The first outer permanent magnet 3*a* is mounted inside the second housing part 15*b*, while the second outer permanent magnet 3*b* and the first and second inner permanent magnets 4*a* and 4*b* are mounted inside the first housing part 15*a*.

The discs or rings of non-metallic material (for example, polymer) 16 are arranged above the first inner permanent magnet 4*a*, below the second inner permanent magnet 4*b* and between the first and second inner permanent magnets 4*a* and 4*b*, so as to space the first and second inner permanent magnets 4*a* and 4*b* apart by the appropriate distance b+2Δy.

The first and second housing parts 15*a* and 15*b* have holes 17 at their edges, so as to allow the two housing parts 15*a* and 15*b* to be attached together by screwing when the latter are arranged against each other so as to place the first outer permanent magnet 3*a* at distance b from the second outer permanent magnet 3*b*. In the embodiment represented in FIG. 10, when the first and second housing parts 15*a*, 15*b* are assembled, air separates the first and second outer permanent magnets 3*a* and 3*b*. However, the first and second outer permanent magnets 3*a* and 3*b* could also be separated by a ring of non-metallic material 6 (as represented in FIG. 5), without departing from the scope of the present invention.

Once the two housing parts 15*a* and 15*b* have been assembled (the magnet assembly 2 thus being arranged such as represented in FIG. 3), the moving element 7 is then inserted into the air gap of the magnet assembly 2 by means of the upper face of the second housing part 15*b*, until the frame 9 comes into abutment with the upper face of the second housing part 15*b*. The frame 9 is then attached by screwing to the second housing part 15*b* by means of the holes 18 formed at the four corners of the frame 9.

The coil 8 is thus located in the air gap between the two inner permanent magnets 4*a* and 4*b* of the magnet assembly 2, in other words, in the constant force factor zone of the magnet assembly 2.

The injection of an amplitude and frequency modulated current into the coil 8 by means of the electrical tracks 13 of frame 9 causes a displacement of the moving element 7, and therefore of the diaphragm 11, (a displacement made possible by means of the flexible arms 10 connected to the frame 9).

The diaphragm 11 then acts as an emissive surface (or sound-producing surface or acoustic radiator) and allows the mechanical displacement of the moving element 7, induced at audible frequency, to be transformed into a sound field.

Although the driver 5 represented in FIGS. 9 and 10 is specifically of the piston type, in another embodiment the coil 8 could also be attached directly to the rear face of the diaphragm 11, without departing from the scope of the present invention.

Furthermore, the entire circumference of the diaphragm 11 could also be connected to the frame 9 (in other words, absence of flexible arms 10), without departing from the scope of the present invention.

Two families of electrodynamic loudspeaker 14 prototypes have been produced and characterized:

- a family 1 presenting a sound-producing surface diameter of 17 mm:
  - outer permanent magnets 3*a* and 3*b*: inner diameter 25 mm, outer diameter 30 mm, thickness 4 mm,
  - inner permanent magnets 4*a* and 4*b*: outer diameter 17 mm, inner diameter 10.25 mm, thickness 2.45 mm, Δy=1.7 mm; and
- a family 2 presenting a diameter for the sound-producing surface of 40 mm:
  - outer permanent magnets 3*a* and 3*b*: outer diameter 39 mm, inner diameter 31 mm, thickness 6.4 mm;
  - inner permanent magnets 4*a* and 4*b*: outer diameter 60 mm, inner diameter 45 mm, thickness 8.03 mm, Δy=3 mm.

The table 1 below summarizes the characteristics of the coils 8 used for various prototypes.

TABLE 1

| LS No. | R (Ω) | Diameter inner coil (mm) | Diameter outer coil (mm) | Diameter wire (mm) with varnish | Diameter wire (mm) without varnish | Number of turns | Wire material | Magnetic field Located at x = 0 (mT) |
|---|---|---|---|---|---|---|---|---|
| 1 | 8.4 | 16 | 17.1 | 0.09 | 0.07 | 50 | copper | 420 |
| 2 | 9.8 | 39 | 40.65 | 0.09 | 0.07 | 25 | copper | 600 |
| 3 | 18 | 39 | 60.65 | 0.07 | 0.06 | 25 | copper | 600 |
| 4 | 8.7 | 16 | 17.1 | 0.09 | 0.07 | 50 | copper | 420 |
| 5 | 10.4 | 39 | 40.65 | 0.09 | 0.07 | 25 | copper | 600 |

The loudspeakers No. 1 and No. 4 belong to the family 1 (17 mm sound-producing surface diameter), while loudspeakers No. 2, No. 3 and No. 5 belong to the family 2 (40 mm sound-producing surface diameter).

For the family 1 loudspeakers No. 1 and No. 4, they all have in common the size of their frame 9 (25×25 mm$^2$) as well as a coil 8 of fifty turns of copper wire (diameter 0.07 mm) presenting overall electrical resistance of approximately R=9Ω. The structures of a first type are developed with their vibrating Kapton® diaphragms 11 stretched over the epoxy glass frame 9. It follows that their resonant natural frequencies are those of the diaphragm modes. Kapton® thicknesses are 25 μm, 50 μm and 125 μm respectively. In contrast, according to a second type of structure (developed on 125 μm-thick Kapton® polyimide film) the piston part is held in place by means of four flexible arms 10 connected to the frame 9. The diaphragm resonance modes tend to disappear with piston structures. The piston can be made of cardboard or Kapton® polyimide.

For the loudspeakers No. 2, No. 3 and No. 5 of the family 2, they all have in common the size of their frame 9 (60×60 mm$^2$) and a coil 8 of twenty-five turns of copper wire with an electrical resistance in accordance with the information in Table 1. One version comprises a Kapton® diaphragm with a thickness of 25 μm, another version comprises a Kapton® piston with a thickness of 125 μm, another version comprises a cardboard piston on Kapton® with a thickness of 125 μm, and another version comprises a piston constituted of foam and carbon on carbon fiber material with a thickness of 200 μm.

With regard to the frequency evolution of the impedance modulus, it is remarkable to note, for each of the prototypes, the invariance characterizing the high-frequency values. This characteristic underlines the absence of dissipative eddy currents. In fact, the prototypes have minimal dissipation.

The processing of impedance measurements allows access to the dissociation of dissipative parts (apparent resistance Re) and stored energy parts (apparent inductance Le).

Thus, it has been seen that in the case of a conventional state-of-the-art loudspeaker, eddy currents appear at high frequencies: with these eddy currents, Re and Le vary with frequency.

In contrast, the prototypes of the invention are characterized by the absence of eddy currents, with Re and Le not varying with frequency.

When designing the electrodynamic loudspeaker 14, the parameters to be considered for dimensioning the electrodynamic loudspeaker 14 are the area and amplitude of displacement of the sound-producing surface (or diaphragm 11), on which the sound level generated by the electrodynamic loudspeaker 14 directly depends. Assuming spherical radiation from the source, the acoustic power is related to the sound level $L_{dB}$ and the distance from the source $l_{source}$, as follows:

$$P_{acoustique} = 10^{L_{dB}/10}\,10^{-12}\,4\pi l_{source}^2$$

This relationship is valid in the far field, in other words, if the measurement distance $l_{source}$ is greater than the radius r of the emissive surface of the source. According to the equation, taking into account a desired sound level of 80 dB SPL at 10 cm, the loudspeaker 14 must generate an acoustic power of 12.6 μW. The acoustic power produced by a single face of the piston is related to its surface area and displacement as follows:

$$P_{acoustique} = \frac{8\rho_{air}\pi^3}{c} f^4 (Sx)^2$$

The quantity pair is the density of air (1.2 kg/m3 at 20° C.), c the speed of sound in air (343 m/s at 20° C.), f the vibration frequency of the sound-producing surface, S its surface area and x its effective displacement. This equation is only valid if the piston behaves like a point source.

By replacing the values for air density and sound velocity, and substituting the peak displacement $x_{max}$ for the effective displacement x in the equation, we obtain:

$$P_{acoustique} = 0.27 f^4 d^4 x_{max}^2$$

This equation shows the two degrees of freedom for acting on the volume of air displaced: the diameter d of the emissive surface and its displacement amplitude $x_{max}$.

For a given piston stroke ($x_{max}$), there is a low operating frequency $f_c$:

17 mm sound-producing surface loudspeaker (family 1): Ø$x_{max}$=4 mm, $f_c$=75 Hz, 40 mm sound-producing surface loudspeakers (family 2): Ø$x_{max}$=4 mm, $f_c$=32 Hz.

It thus appears that the greater the displacement of the piston in a zone where the magnetic field is constant, the more the loudspeaker 14 presents a low frequency response.

It is understood that the particular embodiments just described are indicative and non-limiting, and that modifications may be made without departing from the present invention.

The invention claimed is:

1. A magnet assembly for an electrodynamic loudspeaker driver, the magnet assembly comprising a first outer pair of magnets and a second inner pair of magnets;

the first outer pair of magnets comprising a first outer, axially magnetized, permanent ring magnet and a second outer, axially magnetized, permanent ring magnet, the first and second outer permanent ring magnets being arranged axially facing each other, being spaced apart from each other and having the same first thickness;

the second inner pair of magnets comprising a first inner, axially magnetized, permanent ring magnet and a second inner, axially magnetized, permanent ring magnet, said first and second inner permanent ring magnets being arranged axially facing each other, being spaced apart from each other and having the same second thickness, the first and second inner permanent ring magnets and the first and second outer permanent ring magnets being coaxial, in other words, having the same central axis of symmetry, the first inner permanent magnet being arranged inside the first outer permanent magnet and the second inner permanent magnet being arranged inside the second outer permanent magnet in such a way that an air gap is formed between the first outer pair of magnets and the second inner pair of magnets;

the north-south magnetic field direction of the first inner permanent magnet being opposite to the north-south magnetic field direction of the first outer permanent magnet, the north-south magnetic field direction of the first inner permanent magnet being opposite to the north-south magnetic field direction of the second inner permanent magnet, and the north-south magnetic field direction of the first outer permanent magnet being opposite to the north-south magnetic field direction of the second outer permanent magnet;

wherein the second thickness is less than the first thickness; and the face of the first inner permanent magnet which is facing the second inner permanent magnet is offset by a predefined non-zero offset distance (Δy) relative to the face of the first outer permanent magnet facing the second outer permanent magnet, and the face of the second inner permanent magnet which is facing the first inner permanent magnet is offset by the predefined offset distance (Δy) relative to the face of the second outer permanent magnet which is facing the first outer permanent magnet.

2. The magnet assembly for an electrodynamic loudspeaker driver according to claim 1, wherein the first and second outer permanent magnets are separated by at least one from among air and a non-metallic material such as a polymer.

3. The magnet assembly for an electrodynamic loudspeaker driver according to claim 1, wherein the first and second inner permanent magnets are separated by at least one from among air and a non-metallic material such as a polymer.

4. The magnet assembly for an electrodynamic loudspeaker driver according to claim 1, wherein each of the first and second outer permanent magnets is constituted of two axially magnetized permanent ring sub-magnets, which are superimposed and have the same inner diameter, the same outer diameter, the same north-south magnetic field direction and different thicknesses.

5. The magnet assembly for an electrodynamic loudspeaker driver according to claim 4, wherein, for each of the first and second outer permanent magnets, the permanent sub-magnet facing the other of the first and second outer permanent magnets has a thickness equal to the predefined offset distance (Δy).

6. The magnet assembly for an electrodynamic loudspeaker driver according to claim 1, wherein the ratio of the first thickness to the second thickness is between 1 and 5.

7. The magnet assembly for an electrodynamic loudspeaker driver according to claim 1, wherein the predefined offset distance (Δy) is between 2% and 50% of the first thickness.

8. The magnet assembly for an electrodynamic loudspeaker driver according to claim 1, wherein the air gap between the first outer pair of magnets and the second inner pair of magnets has a spacing of between 0.5 mm and 6 mm.

9. The magnet assembly for an electrodynamic loudspeaker driver according to claim 1, wherein the permanent magnets of the first and second pairs of magnets are made of at least one from among neodymium, iron, boron, cobalt, nickel, a ferromagnetic ceramic comprising at least one from among iron oxide, samarium, zinc and aluminum.

10. An electrodynamic loudspeaker driver comprising a magnet assembly according to claim 1 and a moving element comprising a cylindrical coil support which is partly inserted into the air gap of the magnet assembly and on which is wound a coil arranged in the air gap of the magnet assembly.

11. The electrodynamic loudspeaker driver according to claim 10, characterized in that the moving element is made of polyimide film.

12. An electrodynamic loudspeaker comprising a frame in which are arranged an electrodynamic loudspeaker driver according to claim 10 and a diaphragm connected to the moving element of the driver.

* * * * *